United States Patent
Johnson et al.

(10) Patent No.: US 9,805,083 B1
(45) Date of Patent: *Oct. 31, 2017

(54) METHOD AND COMPUTER PROGRAM PRODUCT FOR ALLOWING A SOFTWARE APPLICATION TO INTERACT WITH A PRODUCT

(71) Applicant: Devicify, LLC, State College, PA (US)

(72) Inventors: Christopher S. Johnson, Port Matilda, PA (US); Jason S. Geiger, Boulder, CO (US)

(73) Assignee: Devicify, LLC, State College, PA (US)

( * ) Notice: Subject to any disclaimer, the term of this patent is extended or adjusted under 35 U.S.C. 154(b) by 18 days.

This patent is subject to a terminal disclaimer.

(21) Appl. No.: 14/755,866

(22) Filed: Jun. 30, 2015

Related U.S. Application Data

(63) Continuation of application No. 14/524,573, filed on Oct. 27, 2014, now Pat. No. 9,075,840.

(51) Int. Cl.
*G06F 17/30* (2006.01)

(52) U.S. Cl.
CPC .. *G06F 17/30365* (2013.01); *G06F 17/30572* (2013.01)

(58) Field of Classification Search
CPC ........ G06F 17/30365; G06F 17/30572; G06Q 10/0875
See application file for complete search history.

(56) References Cited

U.S. PATENT DOCUMENTS

| | | | |
|---|---|---|---|
| 2002/0040352 A1 | 4/2002 | McCormick | |
| 2006/0117238 A1 | 6/2006 | DeVries et al. | |
| 2007/0075128 A1* | 4/2007 | Hall | G06F 17/30575 235/376 |
| 2009/0210320 A1* | 8/2009 | Adelman | G06Q 30/02 705/26.1 |
| 2010/0250487 A1 | 9/2010 | Gabriel et al. | |
| 2011/0258065 A1 | 10/2011 | Fordyce, III et al. | |
| 2013/0006408 A1* | 1/2013 | Zakrzwski | G06Q 10/0875 700/107 |

(Continued)

OTHER PUBLICATIONS

Wikipedia entry for "Amazon Elastic Compute Cloud." Downloaded from web page: <http://en.wikipedia.org/wiki/Amazon_Elastic_Compute_Cloud>, download date: Sep. 22, 2014, page last modified: Aug. 20, 2014, original posting date: unknown, 10 pages.

*Primary Examiner* — Tarek Chbouki
(74) *Attorney, Agent, or Firm* — Panitch Schwarze Belisario & Nadel LLP

(57) ABSTRACT

The functionality of a networked physical product is defined as an abstraction, or a virtual product, in such a way that the product functionality can be interpreted and managed by a business enterprise system. A software application and data model spans isolated databases to store and maintain the functional data and contextual information of a networked physical product and the associated business data needed to manage the product. The functional and contextual data is managed by a purpose-built and optimized heterogeneous database environment, and the associated business data is managed separately in another purpose-built and optimized database environment.

31 Claims, 19 Drawing Sheets

(56) References Cited

U.S. PATENT DOCUMENTS

| | | | | |
|---|---|---|---|---|
| 2013/0018850 A1* | 1/2013 | Houlihan | ........... | G06Q 30/0611 707/690 |
| 2013/0124505 A1 | 5/2013 | Bullotta et al. | | |
| 2013/0166539 A1 | 6/2013 | Clark et al. | | |
| 2013/0290334 A1* | 10/2013 | Kapoor | ............... | G06F 17/3007 707/737 |
| 2014/0310293 A1* | 10/2014 | Knoll | ................ | G06F 17/30575 707/756 |

* cited by examiner

FIG. 10 (Screen1) shows an exemplary attribute as viewed in the first database that reflects some of its properties and any default values
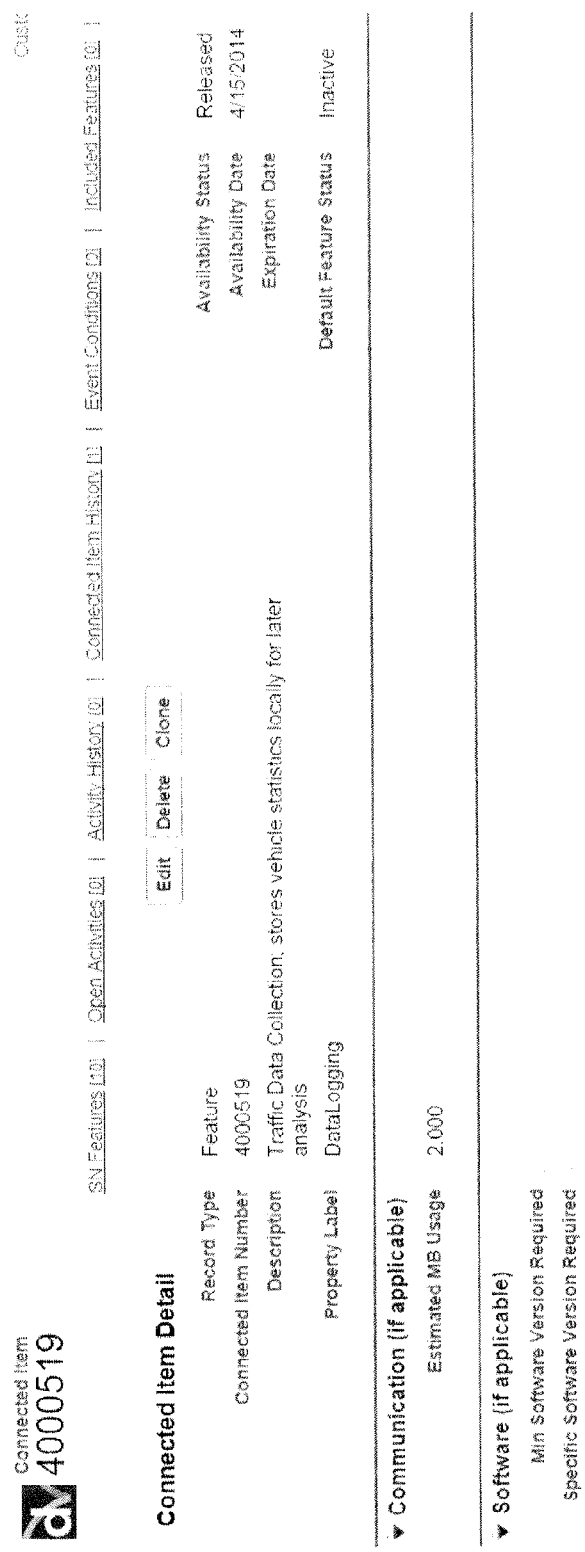

FIG. 11 (Screen2) shows an exemplary attribute as viewed in the second database that reflects some of its properties and any default values
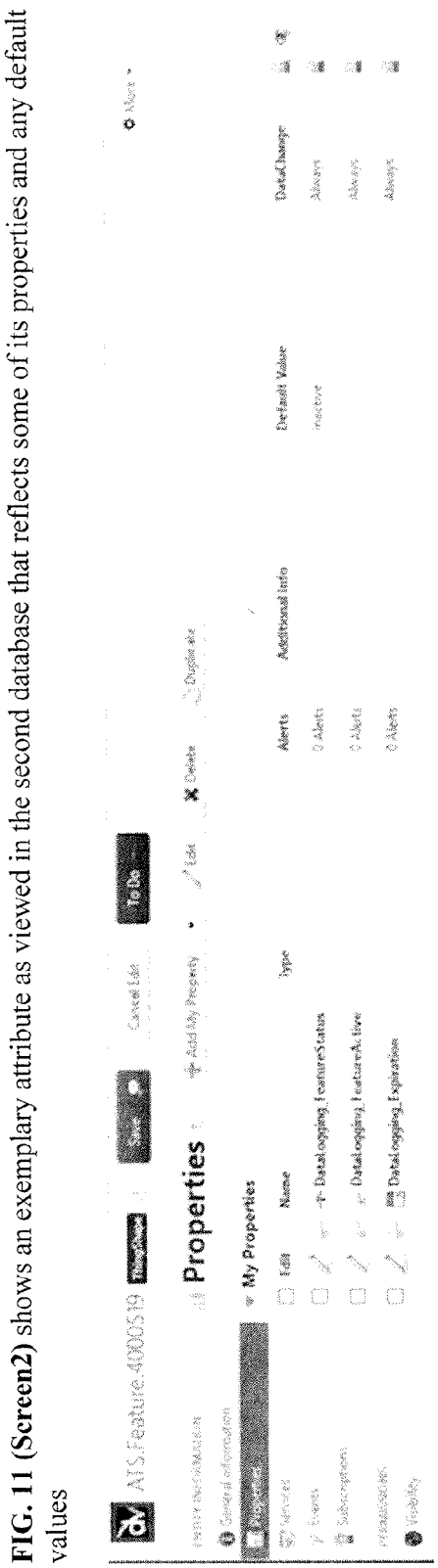

FIG. 12 (Screen3) shows an exemplary template with associated attributes and corresponding properties Bill of Functionality
Blinking Thing with Swapable LED Mo

Customize Page | Edit Layout | Printable View | Help for this Pag

Device Models (x) | Expert Conditions (x) | Service SMs (x-1 | Notes & Attachments (0) | Open Activities (0) | Activity History (0) | Approval History (0)
Bill of Functionality History (3) | Reports: Bos Of Functionality (2)

Bill of Functionality Detail     Edit   Delete   Clone

| | | | |
|---|---|---|---|
| Bill of Functionality Name | Blinking Thing with Swapable LED Mo | Owner | Deucify Admin [Change] |
| Description | Blinking Thing with Swapable LED Module | Availability Status | Released |
| Deucify Key | 1 | Availability Date | 7/31/2014 |
| Is Gateway | | Expiration Date | |

▶ Connection Type (PERMANENT)

▼ Device Status (Default)
    Device Status : Deployed

▼ Relationships (Default)
    Manufacturer : Manufacturer Test Account      Initial Owner Physical : Owner Test Account ▶ Communication (Default)

▶ Connection Permissions (Default)

▶ Serial Numbers & Rules

▶ Nickname & Rules

▼ Device Features (Functionality that can be software-activated)

Assign New

| Action | Connected Item | Property Label | Description | Default Feature Status | Min Software Required | Record Type |
|---|---|---|---|---|---|---|
| | 1000 | FastBlink | Fast Blinking | Active | | Feature |
| | 1001 | ShowBootup | Show Bootup Blinking Pattern | Inactive | | Feature |

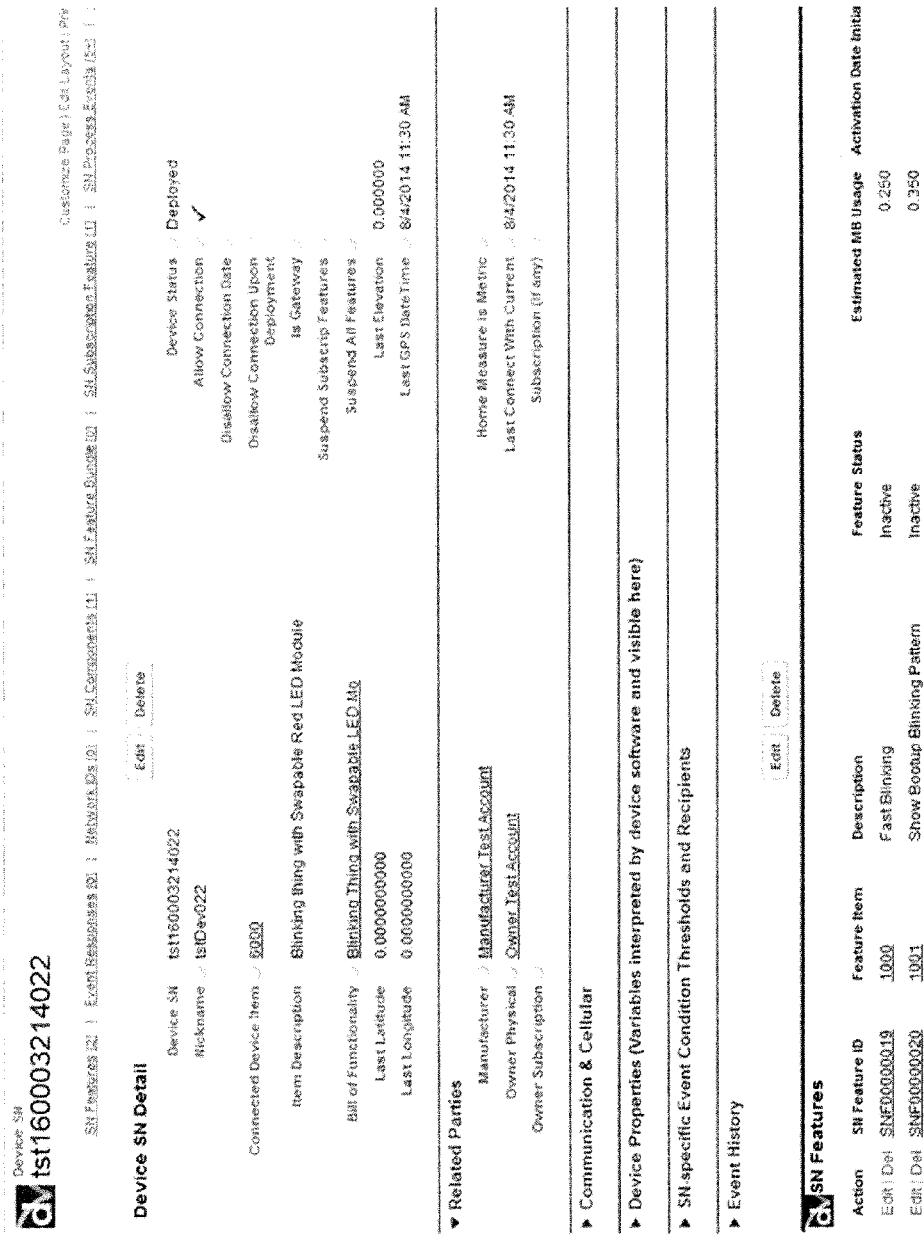
FIG. 13 (Screen4) shows an exemplary virtual product with associated attributes and corresponding properties per the template referenced during creation

METHOD AND COMPUTER PROGRAM PRODUCT FOR ALLOWING A SOFTWARE APPLICATION TO INTERACT WITH A PRODUCT

CROSS REFERENCE TO RELATED APPLICATION

This application is a continuation of copending U.S. application Ser. No. 14/524,573 filed Oct. 27, 2014, which is incorporated by reference herein.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

This invention generally relates to the design, creation, use, and management of networked products, physical devices, and sensors; heterogeneous data and information derived from the devices and associated computer applications and systems for effective human or machine interactions, decision making, and business purposes.

Intelligent device networking, sometimes referred to as the Internet of Things, is a rapidly evolving technological revolution. Intelligent device networking refers to physical devices, products, and sensors with varying levels of digital intelligence that can be connected to networks of varying scale, from a local area network to the Internet. Millions of such physical intelligent devices are connected to the Internet, with billions more anticipated as the Internet of Things evolves. The sheer volume of these types of devices and the huge amounts of data derived from the devices will require significant changes in current technological approaches to ensure that human users and computing systems can access, integrate, manage, and use the devices and their data in real time.

The evolution of intelligent device networking requires connected product providers to reconsider and investigate new methods for designing connected products. A connected product retains either a continuous or an intermittent network connection to a server in a way that current stand-alone and unconnected products do not. The server and associated infrastructure may be hosted directly by the provider, or the provider may contract the infrastructure and services from a third party. The data collected from the product via this connection gives the provider extensive new opportunities to better understand how customers make use of the product and how the product is performing. The connection also lets the connected product provider manage or control the product, to offer product data, remote management and analysis as an additional service to customers, or to design optional services and features into the product that can be initiated at any time requested. The networking of intelligent devices will lead to sharing of data and information among the devices and other web services, new and unforeseen business models, information services and applications, and product features that producers of connected products will need to implement at the design stage.

Technology solutions for the Internet of Things tend to focus on the connectivity of the products via typical client/server device management systems that usually store only the data and information that can be derived from, and are specific to the connected product. These data can be made available to other separate computing applications and systems, including business systems, but normally by Application Programming Interfaces (API's) requiring significant complex custom software development. In many cases, the custom software solutions are rigid, lack robustness, and are not portable between different systems and applications. Furthermore, implementing this kind of custom software is expensive and time consuming. Linking disparate systems by API is problematic for many reasons. Changes in one area of the system do not automatically propagate to all other parts of the systems which can cause parts of the system to break when other areas are upgraded or modified. Some capabilities not inherently known by the business systems may require significant duplication of the system functionality which also leads to a much less robust and overly complicated system. This also leads to a duplication of the API calls as multiple areas of one system may call the same data from another system.

The value of intelligent networked devices is best realized by unifying the connected products management system and the data and information that the system provides with complementary information contained in the enterprise systems of entities that manufacture or use the connected products. Unification of these systems and data allows the manufacturer to manage, monitor, and control their connected products within the same enterprise system that they use to manage their customer orders, inventory, billings, service, and relationship information. Currently these disparate systems are not unified and are generally not interoperable. Intelligent networked devices require flexible and scalable databases and servers that can accommodate heterogeneous and highly unstructured data. On the other hand, most enterprise systems are designed to provide rigid, relational structure for the data and information that they manage. As a result, current technology effectively places the unstructured data from networked devices in one silo, and the structured data for an enterprise system in another separate silo. This "silo effect" slows and limits the resulting collective intelligence that can be obtained to drive innovation, create new products and services, and enhance the design and value of intelligent networked devices.

These are serious limitations of current systems for intelligent device networking. The emergence of intelligent device networking requires more flexible, scalable, and compatible data and information technologies and software applications that can be unified with enterprise system software applications so that innovative new business models can emerge and drive the evolving Internet of Things forward. The present invention fulfills such a need.

SUMMARY OF THE INVENTION

Methods, software applications, and systems for integrated intelligent device networking are disclosed that define the functionality of a networked physical product as an abstraction, or a virtual product, in such a way that the product functionality can be interpreted and managed by an enterprise system. The methods utilize a software application and data model that spans isolated databases to store and maintain the functional data and contextual information of a networked physical product and the associated business data needed to manage the product. The functional and contextual data can be managed by a purpose-built and optimized heterogeneous database environment, and the associated business data can be managed separately in another purpose-built and optimized database environment. An electronic template, similar to a bill of materials, describes the functional and interactive elements of a networked virtual product that will represent the networked physical products as they are created. An enterprise software system can be included that links business management software to the data and information generated by the networked product. User interface and web application development tools can be included for access to and use of the networked product and business data.

BRIEF DESCRIPTION OF THE DRAWINGS

FIG. 10 is a screenshot that shows an exemplary attribute as viewed in a first database that reflects some of its properties and any default values.

FIG. 11 is a screenshot that shows an exemplary attribute as viewed in a second database that reflects some of its properties and any default values.

FIG. 12 is a screenshot that shows an exemplary template with associated attributes and corresponding properties.

FIG. 13 is a screenshot that shows an exemplary virtual product with associated attributes and corresponding properties per the template referenced during creation.

DETAILED DESCRIPTION OF THE INVENTION

Certain terminology is used herein for convenience only and is not to be taken as a limitation on the present invention.

This patent application includes an Appendix having a file named Appendix681672-8U1.txt, created on Jun. 25, 2015, and having a size of 15,799 bytes. The Appendix is incorporated by reference into the present patent application. One preferred embodiment of the present invention is implemented via the source code in the Appendix. The Appendix is subject to the "Copyright Notice and Authorization" stated above.

The source code includes five code snippets. The functionality of the respective code snippets is summarized as follows:

Code1 is a portion of the code that uses the first attribute record as the basis to create the corresponding second attribute record.

Code2 is a portion of the code that uses the first template record as the basis to create the corresponding second template record.

Code3 is a portion of the code that associates an attribute with a template.

Code4 is a portion of the code that uses a referenced template to determine the relevant attributes and property values to create and associated with a subsequently created virtual product.

Code5 is a portion of the code that identifies a corresponding property in a second database when a change to the value of a property is detected in a first database.

The present invention is described in the context of a software application that can interact with and control a physical product that is electronically connected to a network such as the Internet. The software application retains specific information that describes the networked product, collects data and information from the networked product and stores and manages the data in a fashion that spans a pair of isolated databases. One database is purpose-built to store and manage the data generated by the networked product, while the other is purpose-built to store and manage business management data associated with the networked product. The software application links the networked product data with the business management data and makes the data available to enterprise software systems that manage the networked product, and to user interfaces displaying specific data generated by the networked product.

Figure 1:
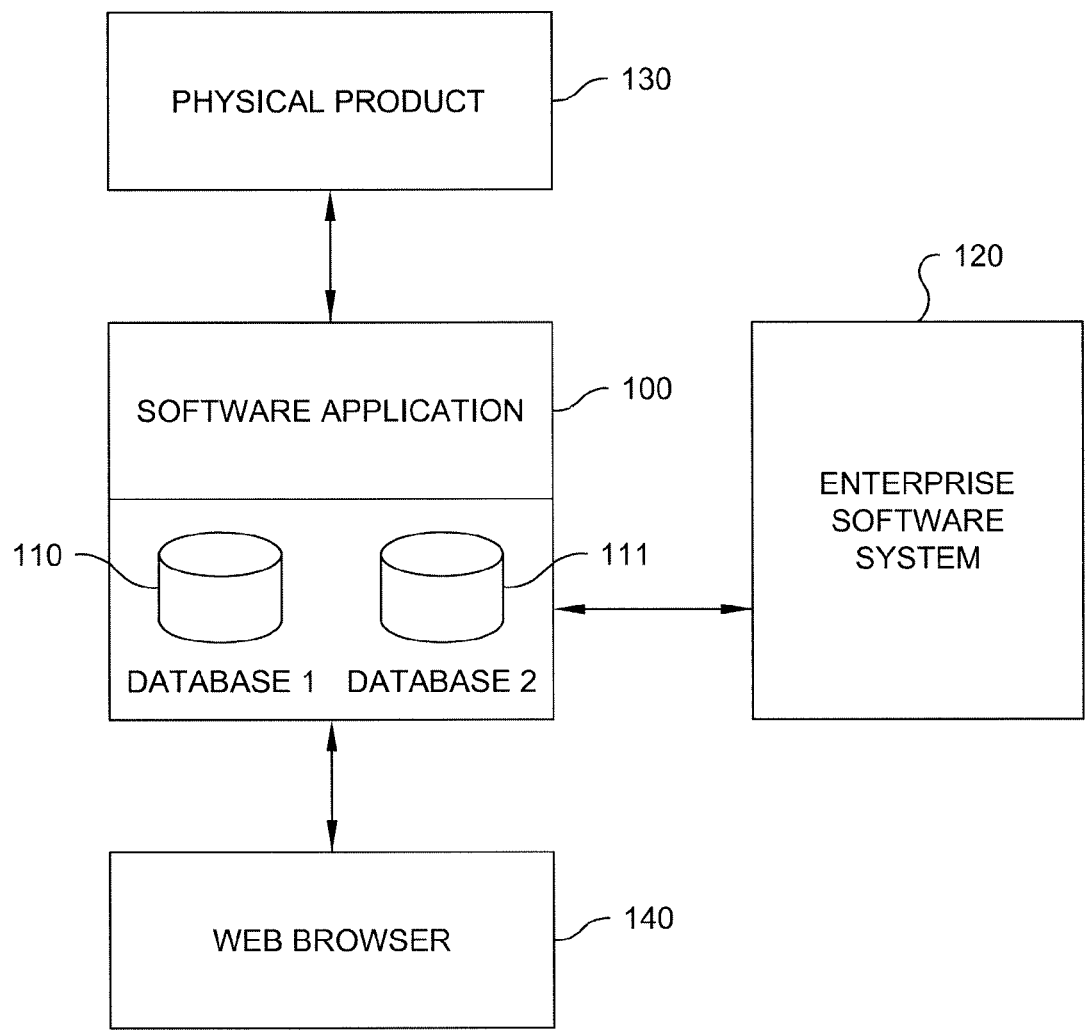
FIG. 1 is an overview of how a networked physical product interacts with the software application.

The interaction between the networked product and the software application is represented by FIG. 1, and the interaction includes at least the following steps:

1. Provide a physical, networked product capable of sensing and generating data relevant to the function of the product. The product connects electronically to a computer or server running the software application to receive commands from the software application and to send data to the software application. Conversely, the product connects electronically to a computer or server running the software application to receive commands from the software application and to make changes to the software installed in the product thus causing changes to the function of the product.

2. The software application spans isolated databases and retains data and information specific to the business management of the networked product in a first or second database, and data and information specific to the networked product in a first or second database.

3. The software application creates records in each database that share unique identifiers so that the business information associated with the networked product and the data collected by the networked product are synchronized and act as a single unified record spanning two purpose-built databases.

4. The software application makes the product data and information available to other enterprise software system applications that need the data and information in order to manage a business function related to the networked product. The software application also provides the product data and information to other web applications and user interfaces for reporting, analysis, and monitoring of the networked product and its data.

FIG. 1 is a schematic block diagram of one exemplary implementation of the present invention. A networked physical product 130 is in communication with the software application 100 running on a server via an electronic connection, such as the Internet The physical product is created partly on the basis of an electronic template that is retained in the software application. The template is specific to a product family and includes a list of electronically controllable attributes that are incorporated into all individual instances of products of this family when the product is made. In this regard, the template is similar to a traditional manufacturing bill of materials but differs since it includes those attributes of the networked product that interact with the software application. The template also lists and describes the properties that are used to model an abstraction of the physical product, the virtual product, and its electronically controllable attributes.

Attributes associated with the template include, but are not limited to, the physical components and features that are functional parts of the product that are capable of interaction with the software application via an electronic connection. Examples of physical components include, but are not limited to, sensors, printed circuit boards that contain a microprocessor, actuators, and the like. Examples of features include, but are not limited to, the ability to turn components on or off, the ability to change the degree of performance of components, services associated with the data generated by the product, the ability of the product to respond in a defined way to certain conditions or events, and the like. Some features have a time association that can define their status and their type of function based on the current date. The properties included in the template are used by both the software application and the software installed in the product for communication, the exchange of commands and information, and for control of the product and its attributes.

When a template is completed, unique records for the template are created in each of database 1 (110) and database 2 (111), alternatively referred to herein as "first database" and "second database," respectively. Collectively, the records include the attributes, properties, and unique identifiers and labels associated with that product family and its capabilities. For example, the unique records created in database 1 will include the attributes and properties needed for the business management of the product, and the unique records created in database 2 will include the attributes and properties needed to manage and control the product and the data that originates with the product. Included in each record is a unique identifier common between the pair of records. The software application uses the unique identifiers to synchronize or link the record in database 1 and database 2 so that the linked records act as if they are single record created in a single database. Linking the records in this fashion eliminates the "silo effect" common in intelligent device networking and minimizes the need for API programming to allow the two disparate databases to communicate and exchange data and information.

The physical product is connected to a server via a communications module that supports cellular transmission, satellite, Ethernet, WiFi, and other forms of electronic transmission. The software application (100) retains data and information about the networked product that are data normally associated with the business function and use of the product in database 1 (110). Such information may include, but is not limited to, the name of the product owner the features included with the product, anticipated data transmission for the product, etc. The software application (100) also collects and stores data and information associated with the networked product in database 2 (111). These data are typically outputs from sensors and other sensing components embedded in the networked product. The software application synchronizes, or links, the data stored in the databases and makes the product data available to the enterprise software system (120) either by exposing data in a manner and organization that is consistent with typical enterprise software system applications, or normalizing the device data so it is more easily consumed. The software application supports a user interface that is accessible from a Web browser, or other application interface, (140) so that data from the networked product can be viewed, reports can be generated, or other applications requiring the data can be launched.

Exemplary Software Application

Figure 2A:
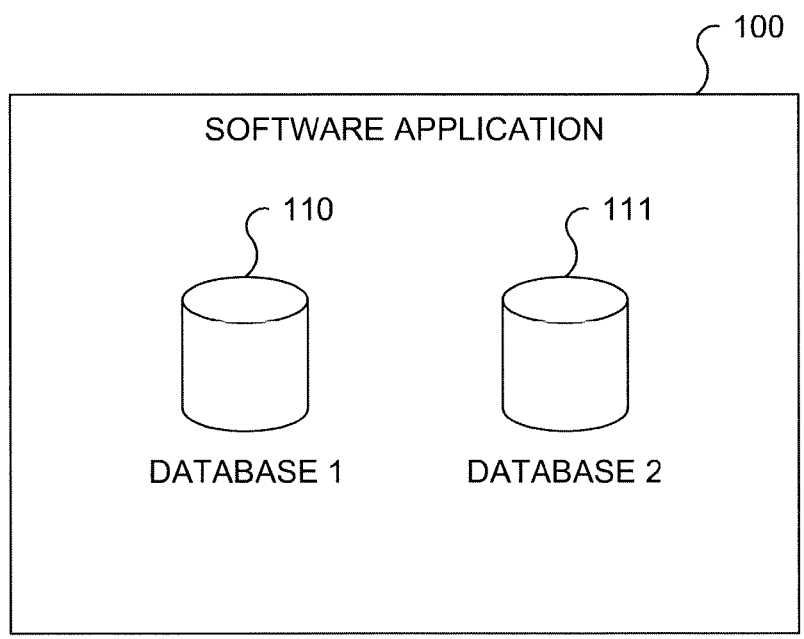
FIGS. 2a-2c are block diagrams illustrating exemplary software applications.
Figure 2B:
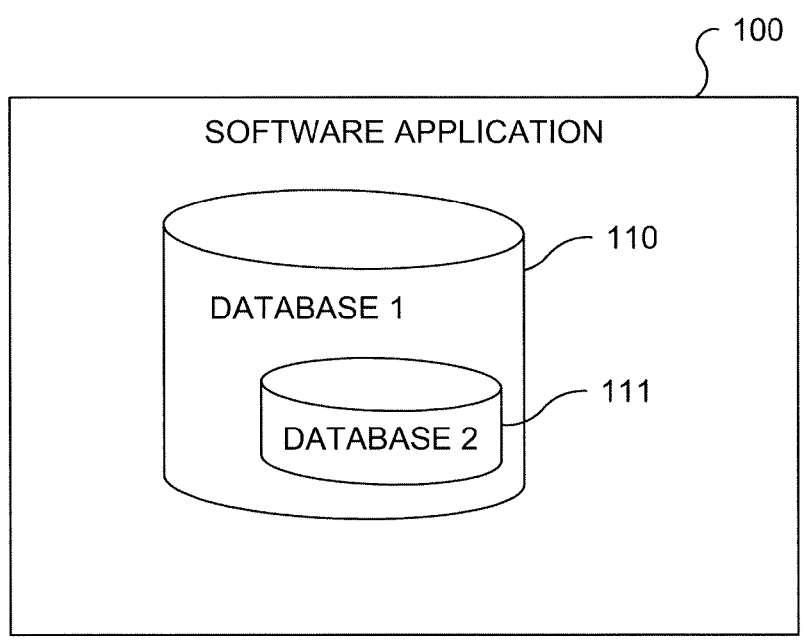
Figure 2C:
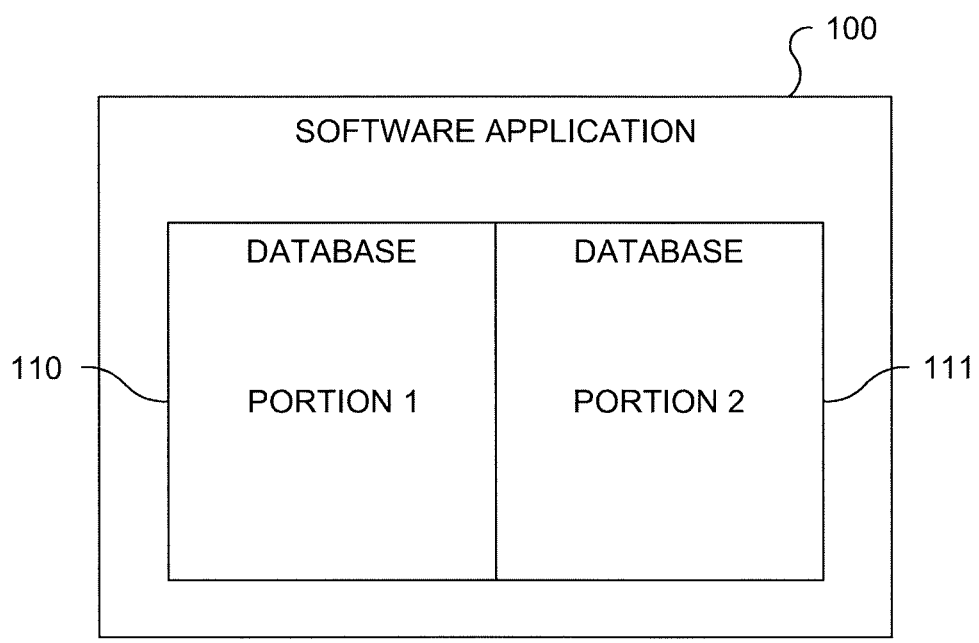

FIG. 2a is a block diagram illustrating an exemplary software application. The software application 100 includes machine readable code that executes commands and the databases used to organize the data. The databases may be physically or geographically separated as in the case where database 1 (110) is purpose-built to store and manage business management data associated with the networked product and resides, for example, on the Salesforce® Force.com platform; and database 2 (111) is purpose-built to store and manage the data collected by the networked product 130 and resides on a cloud-based infrastructure, such as Amazon Web Services (AWS) EC2 platform. FIG. 2b shows an alternate arrangement that embeds database 2 within database 1 in the same environment. FIG. 2c shows another alternate arrangement that partitions the data model within a single database in a way that effectively isolates two portions of a single database so that Portion1 functions as a proxy for database 1 and portion 2 functions as a proxy for database 2.

Exemplary Enterprise Software

Figure 3:
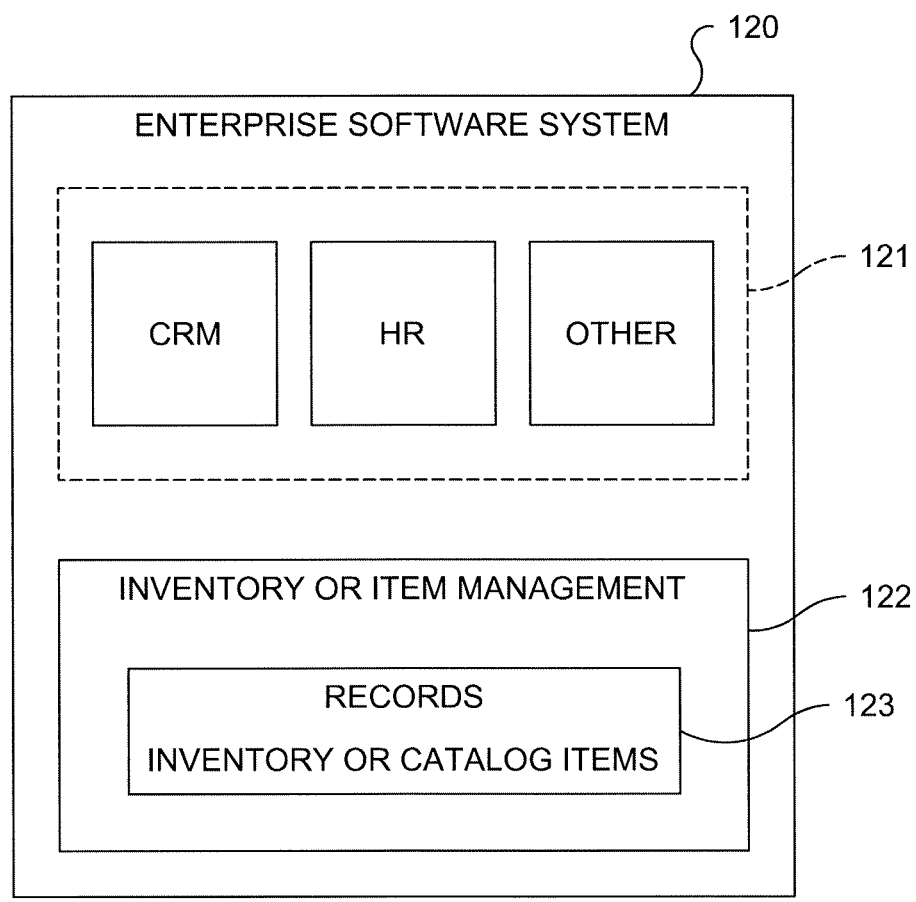
FIG. 3 is a block diagram illustrating an exemplary enterprise software system.

FIG. 3 is a block diagram illustrating an exemplary enterprise software system. Enterprise software 120 supports many processes and recording purposes 121 in an organization. Among those most likely to interface with the software application is inventory or item management 122. These could be any software tool that stores or manages the inventory or catalog items 123.

Exemplary Physical Product

Figure 4A:
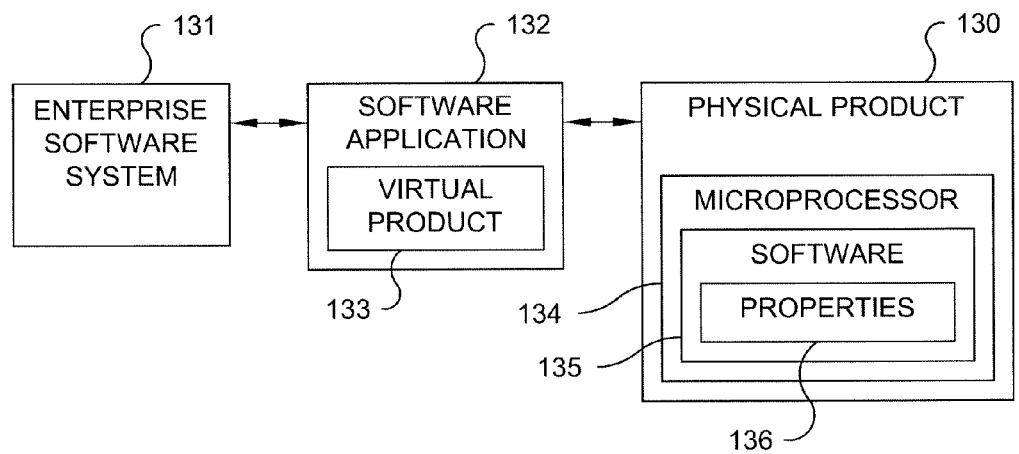
FIG. 4a is a block diagram illustrating an exemplary physical product.

FIG. 4a is a block diagram illustrating an exemplary physical product. The physical product 130 is the complete functional unit managed by the enterprise software system 131, via the software application 132 that is able to interact with the physical product. The level of sophistication can be determined by the user of the software application since an automobile might be the physical product to a car manufacturer, while a subassembly such as a pump on that car might represent the physical product to the pump manufacturer.

The physical product has a corresponding virtual product 133, which is an abstraction or digital representation within the software application 132 of the product's current identity, attributes and properties. The physical product includes a microprocessor 134 or memory component which contains and/or executes software installed in the product 135 that imparts some functionality to the physical product. This product software contains properties 136 that can be interpreted by the software 135 as variables used by the product to perform its function. Those properties can be dynamic variable with names and values used to adjust settings or capabilities, such as "Temperature Monitoring Enabled" (Yes/No) as well properties with names and values that can log or accumulate data collected by the product, such as "Current Temperature" (temperature, degrees F.).

Figure 4B:
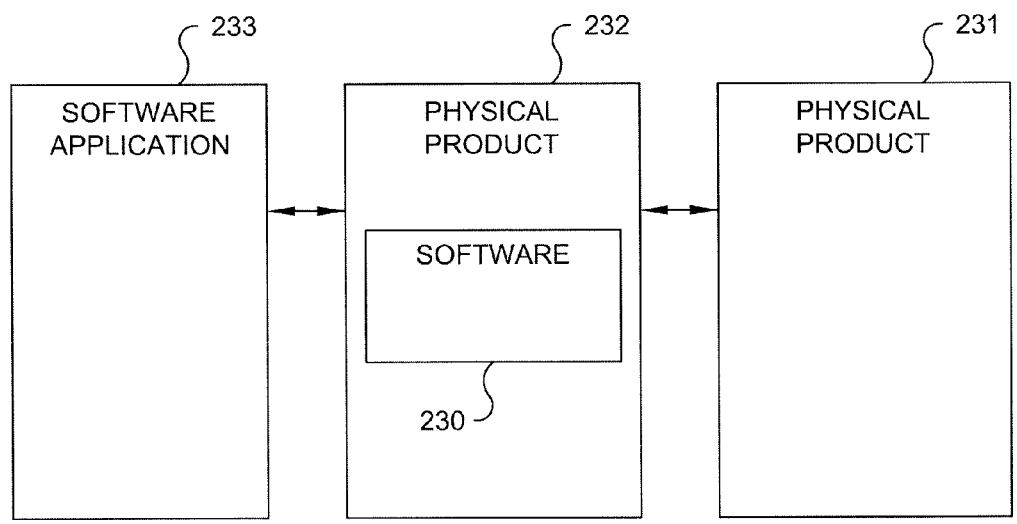
FIG. 4b is a block diagram illustrating an alternate embodiment of a physical product.

FIG. 4b is a block diagram illustrating an alternate arrangement of a physical product. In some cases, the software 230 used to control the physical product 231 resides outside the physical product, such as the case where another physical product 232 such as a gateway or server is consolidating the communication or absorbing the processing or software execution requirements on behalf of the other physical product 231, such as a remote sensor, and then interacting with the software application 233 itself.

Exemplary Attribute

Figure 5:
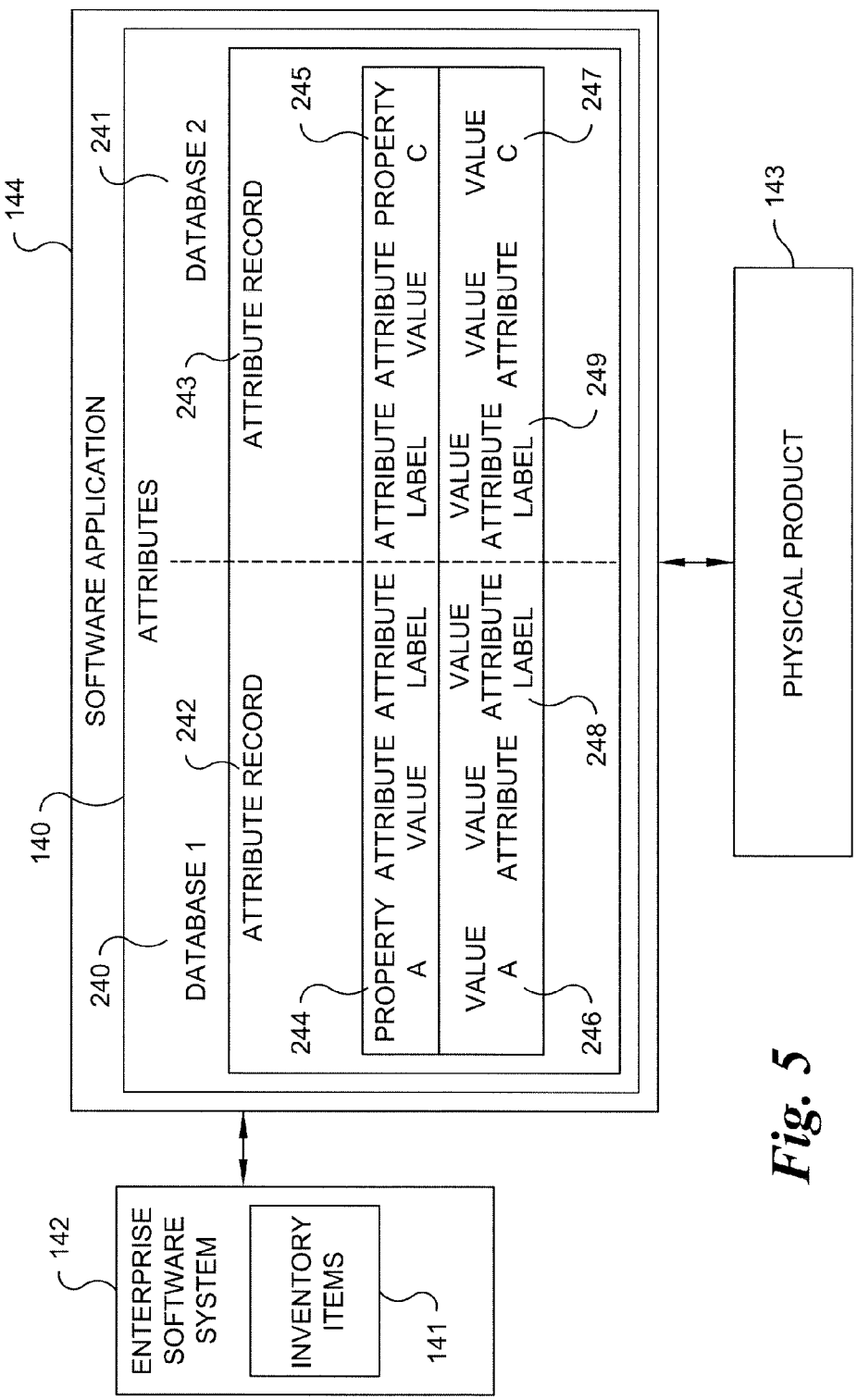
FIG. 5 is a block diagram illustrating an exemplary attribute.

FIG. 5 is a block diagram illustrating an exemplary attribute. Attributes 140 correspond to those inventory or catalog items 141 which represent some type of product functionality or which require some degree of ongoing interaction or management as part of the physical product 143 by the enterprise software system 142 via the software application 144. The attributes are an element of the software application 144. The attributes extend the meaning of the conventional inventory item by adding the functional context, such as duration, version, installation state, etc. that may apply to different types of attributes, and enhance the interaction between the software application and physical product.

The attributes 140 includes two attribute records (242 or 243) that exist in a first 240 and second 241 database. In creating an attribute, an attribute record is created in one of the databases and includes some properties (244 or 245) and default values (246 or 247), if any, for those properties (FIG. 10, FIG. 11). The application will create (Code1) the corresponding attribute record in the other database using a common value for the attribute label property (248 or 249), and some additional properties (244 or 245) and default values (246 or 247), if any, for those properties. Some properties and their default values may exist in both databases and are synchronized or linked by the application by using the common value for the attribute label property (248 or 249) to identify the proper counterpart to update.

In FIGS. 5-9, a dashed line is used to delineate the portions of the Software Application that exist in database 1 versus database 2.

Exemplary Template

Figure 6A:
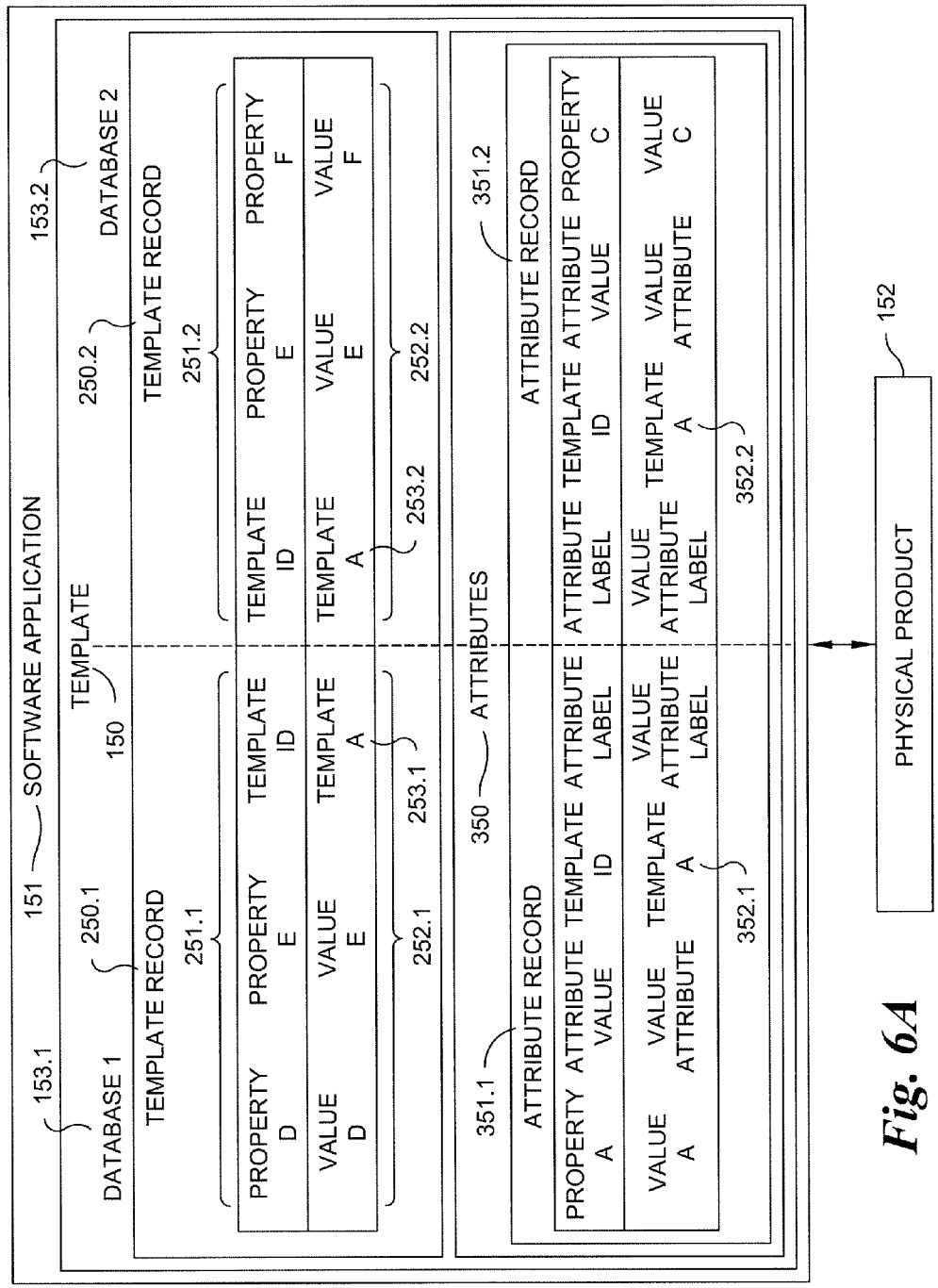
FIG. 6a is a block diagram illustrating an exemplary template.

FIG. 6a is a block diagram illustrating an exemplary template. The template 150 is an organizational design tool within the software application 151 representing the functional and interactive attributes that will be inherited by functional groups of individual physical products 152. The template can apply to a single product model inventory item or to many product models that exhibit the same or similar functionality.

The template 150 includes two template records (250.1, 250.2) and some number of attributes 350 that exist in a first 153.1 and second 153.2 database.

In creating a template 150, a template record (250.1, or 250.2) is created in one of the databases and includes certain properties (251.1 or 251.2) and any default values (252.1 or 252.2) for those properties. The application will create (Code2) a corresponding record in the other database using a common value for the template ID property (253.1 or 253.2) and some additional properties (251.1 or 251.2) and default values (252.1 or 252.2), if any, for those properties.

A sense of functionality is assigned to each template 150 by associating one or more attributes 350 with the template (Screen 3). The attribute record (351.1 or 351.2) in both databases has a property value for the template ID (352.1 or 352.2) that associates it with the template 150 to which it belongs.

Figure 6B:
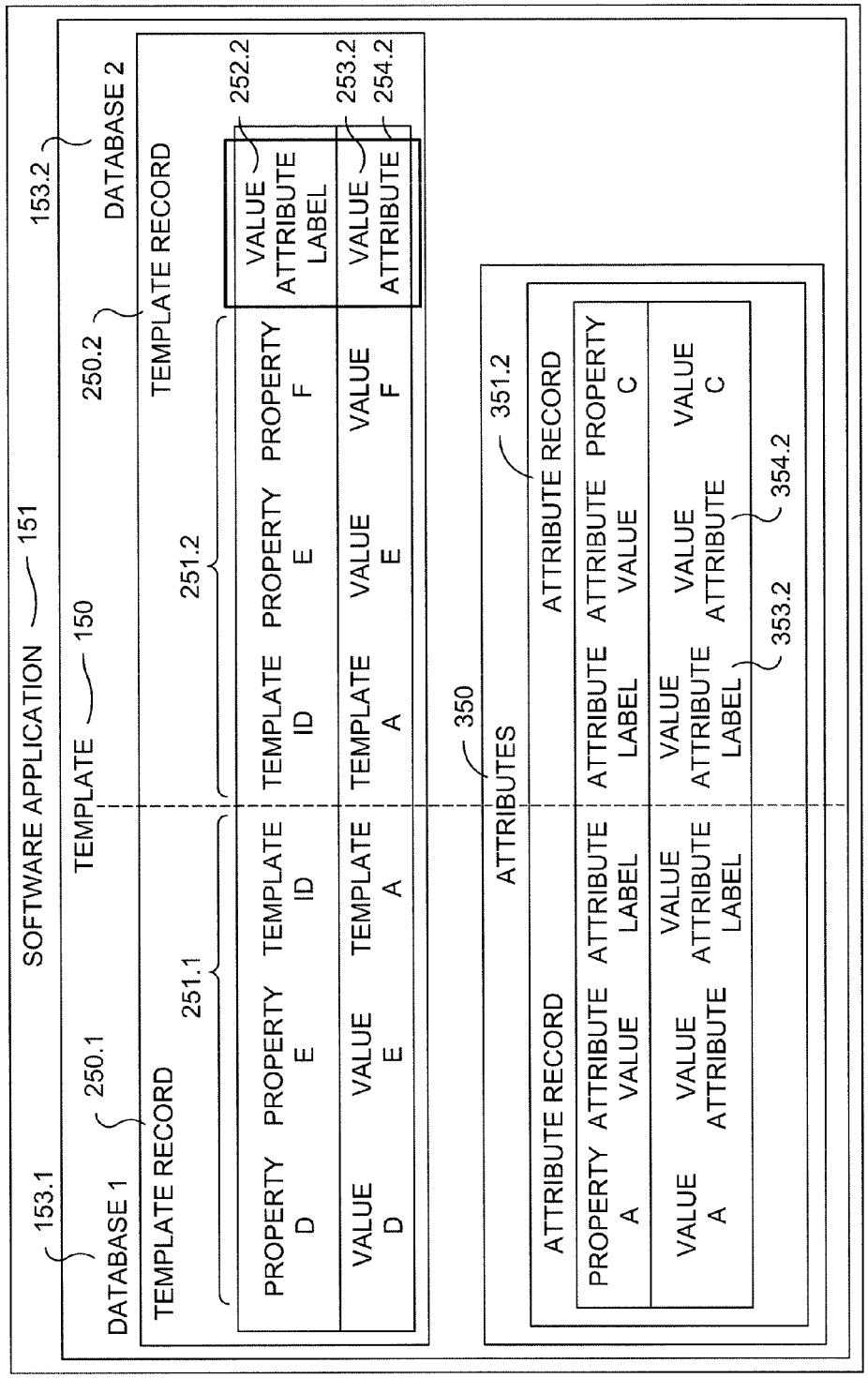
FIG. 6b is a block diagram illustrating an alternative embodiment of an exemplary template.

FIG. 6b is a block diagram illustrating an alternative embodiment of an exemplary template wherein a sense of functionality is assigned to each template 150 by associating (Code3) one or more attributes 350 with the template. The attribute record 351.2 in one of the databases is referenced as a property 254.2 directly on the template record 250.2 that consists of an attribute label 252.2 that corresponds to the value of the attribute label 353.2 for the corresponding attribute record 351.2 and an attribute value 253.2 that corresponds to the value of the attribute 354.2 for the corresponding attribute record 351.2.

Exemplary Virtual Product

Figure 7A:
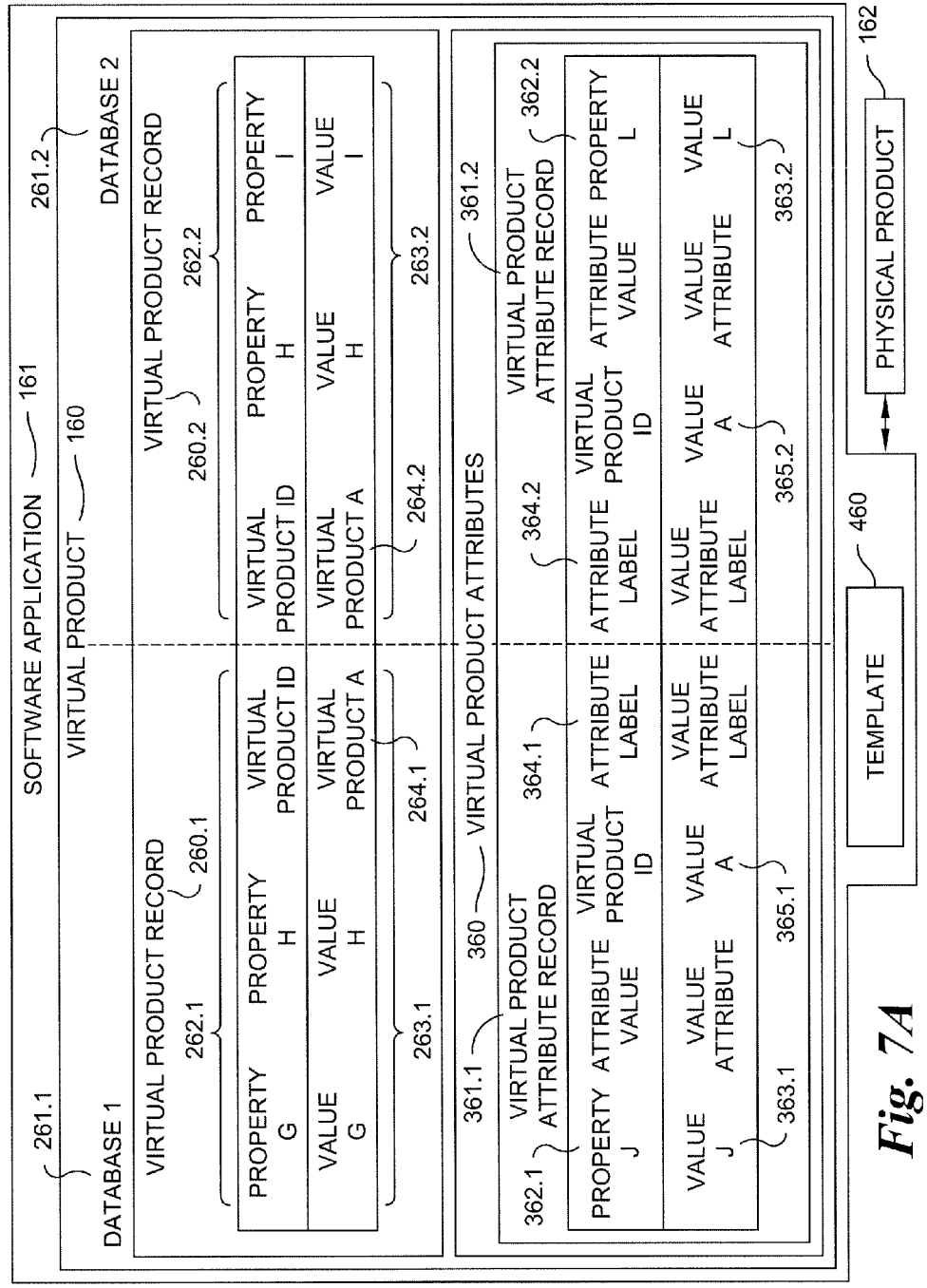
FIG. 7a is a block diagram illustrating an exemplary virtual product.

FIG. 7a is a block diagram illustrating an exemplary virtual product. The virtual product 160 is an abstract element of the software application 161 that represents the functional and interactive capabilities of an individual physical product 162.

The virtual product FIG. 13 (Screen4) includes two virtual product records (260.1, 260.2) and some number of virtual product attributes 360 that exist in a first 261.1 and second 261.2 database. In creating a virtual product 160, an appropriate source template 460 is referenced, thereby allowing the following:

A virtual product record (260.1, 260.2) is created (Code4) in one of the databases and inherits certain properties (262.1 or 262.2) including any default values (263.1 or 263.2) from the referenced template 460. The application will create a corresponding record in the other database using a common value for the virtual product record ID property (264.1 and 264.2) and some additional properties (262.1 or 262.2) and default values (263.1 or 263.2), if any, for those properties;

A sense of functionality is applied to each virtual product 160 by reproducing the referenced template's 460 attributes as the resulting virtual product's 160 virtual product attributes 360. A virtual product attribute record (361.1 or 361.2) is created in one of the databases for each attribute from the template 460. Each virtual product attribute record (361.1 or 361.2) inherits properties (362.1 or 362.2) including any default values (363.1 or 363.2) from the corresponding template 460. The application may create corresponding virtual product attribute records in the other database using a common value for the attribute label property (364.1 or 364.2).

The virtual product attribute record (361.1 or 361.2) in both databases has a property value (365.1 or 365.2) that references the virtual product to which it belongs in the event the common attribute label is not unique across the database.

Figure 7B:
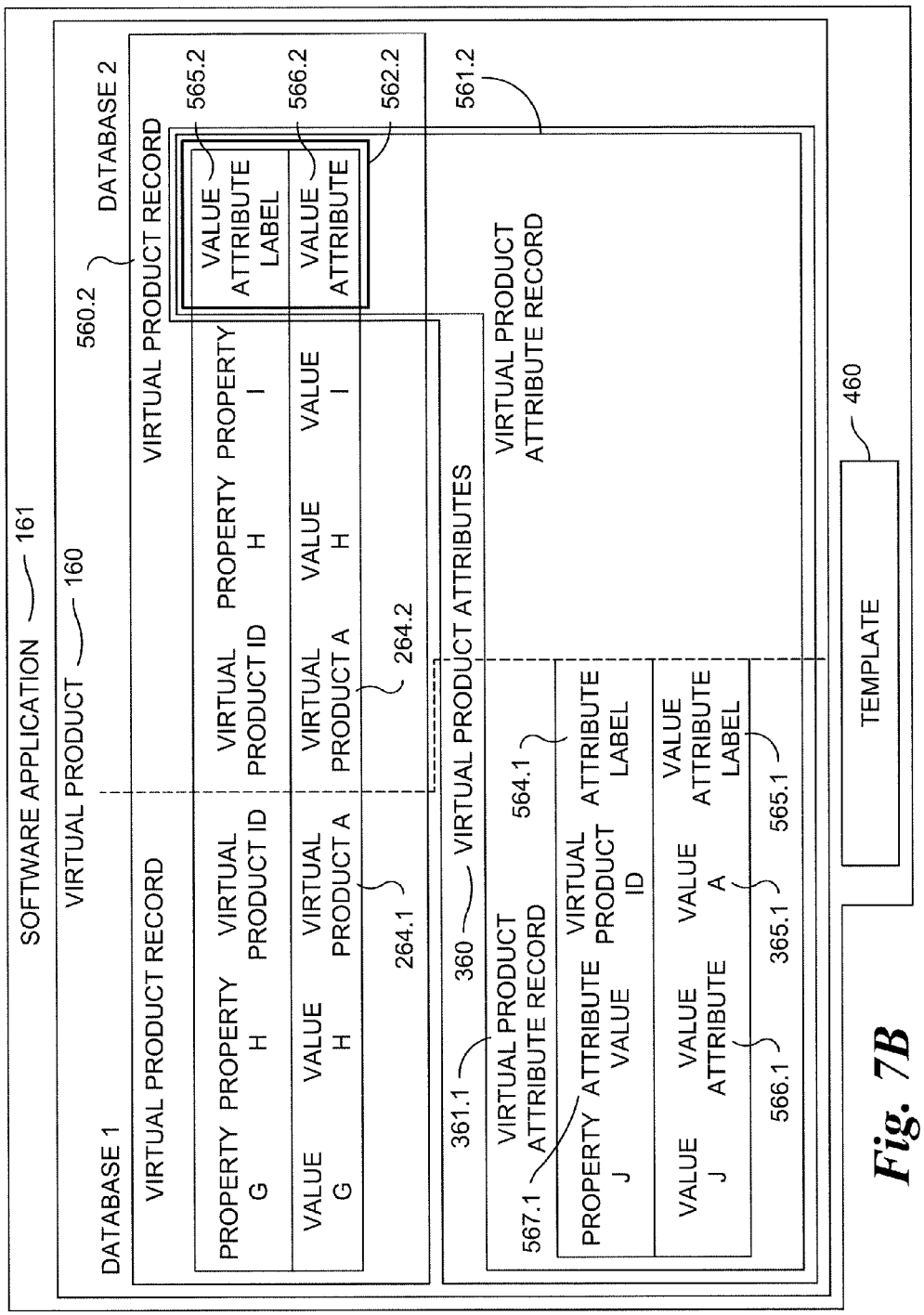
FIG. 7b is a block diagram illustrating an alternative embodiment of an exemplary virtual product.

FIG. 7b is a block diagram illustrating an alternative embodiment of an exemplary virtual product described by FIG. 7a. The virtual product attribute record 361.1 in one database has a property value 365.1 that references the virtual product to which it belongs and includes properties for an attribute label 564.1 and the attribute value 567.1. The portion of the virtual product attribute 561.2 in the other database is appended to the virtual product record 560.2 having a common virtual product ID (264.2) as a virtual product attribute property 562.2 on the virtual product record 560.2. This virtual product attribute property 562.2 consists of a virtual property attribute label 565.2 that corresponds to the value of the attribute label 565.1 in the first database and a corresponding value 566.2 that corresponds to the value of the attribute 566.1 in the first database.

Figure 7C:
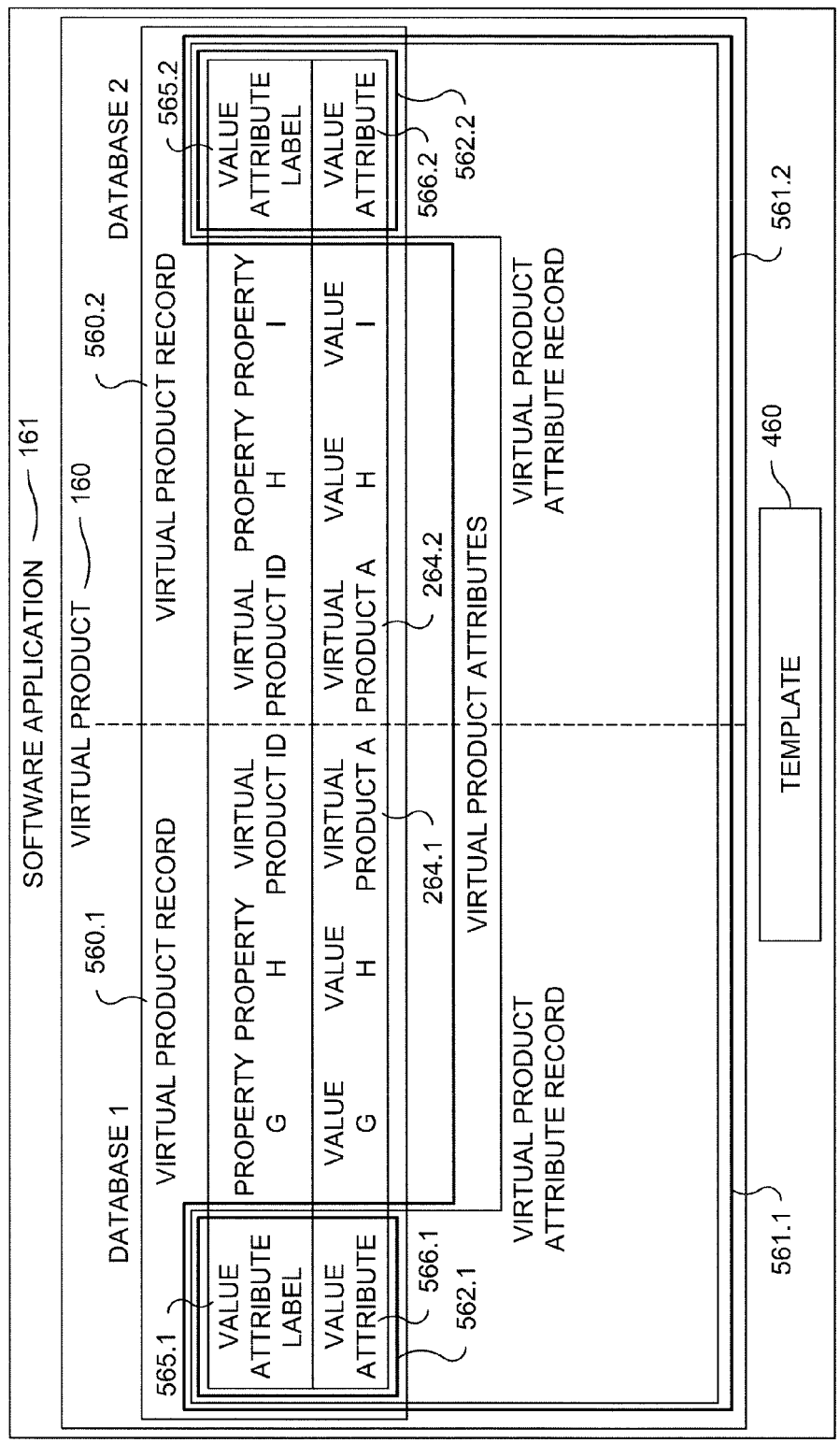
FIG. 7c is a block diagram illustrating an alternative embodiment of an exemplary virtual product.

FIG. 7c is a block diagram illustrating another alternative embodiment of an exemplary virtual product described by FIG. 7a. The portions of the virtual product attributes (561.1 or 561.2) with a common attribute label (565.1 or 565.2) in both databases are appended to the virtual product record (560.1 or 560.2) with a common virtual product ID (264.1 and 264.2) as a property (562.1 or 562.2) consisting of a virtual product attribute label (565.1 or 565.2) and its corresponding value (566.1 or 566.2).

Exemplary Attribute Property Updates

Figure 8A:
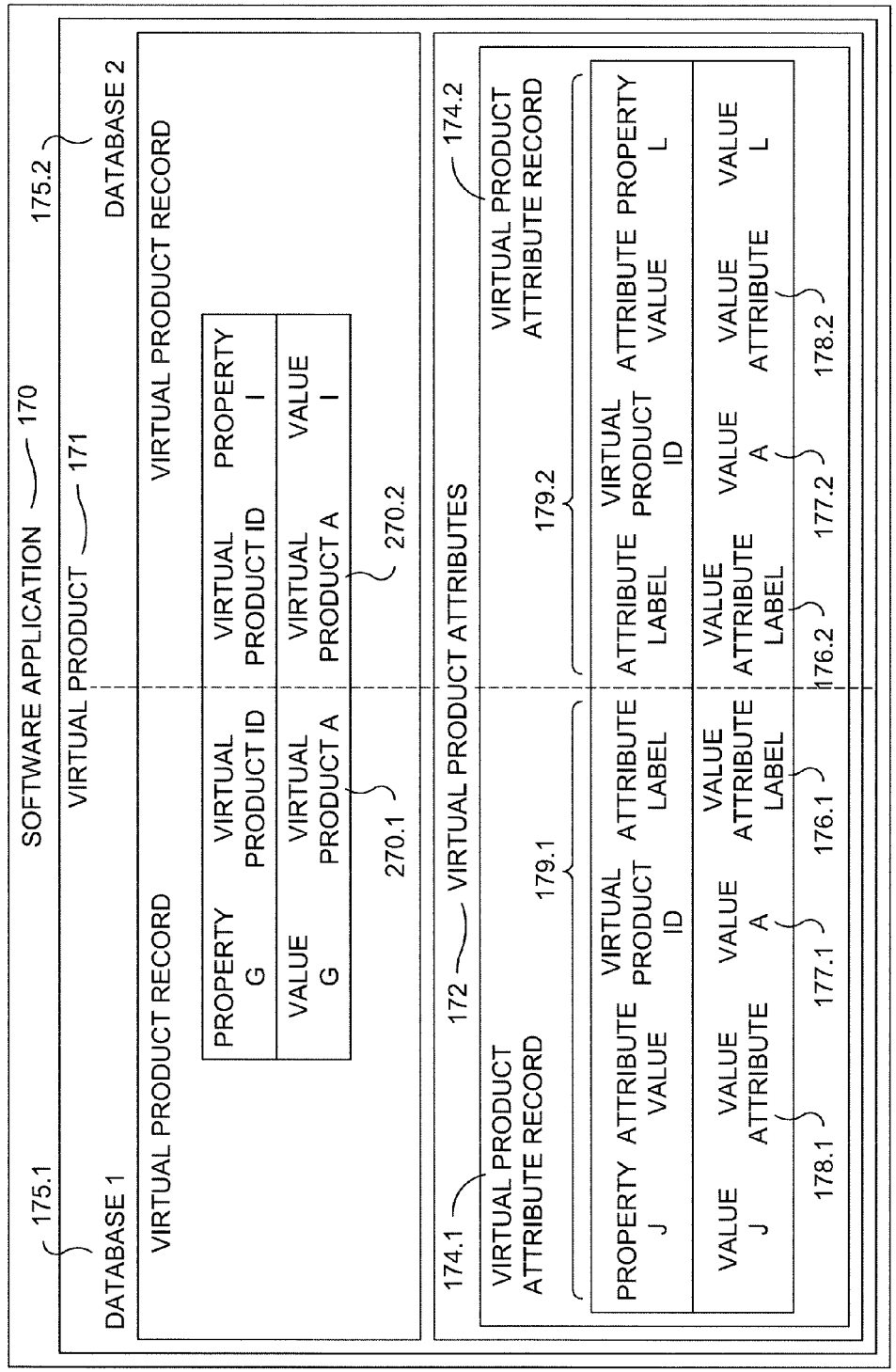
FIG. 8a is a block diagram illustrating an example of updating properties on an attribute.

FIG. 8a is a block diagram illustrating an example of updating properties within a virtual product attribute. Each virtual product 171 within the software application 170 has one or more virtual product attributes 172, a portion of which (174.1 and 174.2) resides in a first or a second database (175.1 and 175.2). Each portion of a virtual product attribute record (174.1 and 174.2) shares certain properties including a virtual product record ID value (177.1 and 177.2), an attribute label value (176.1 and 176.2), and a corresponding attribute value (178.1 and 178.2) that can be synchronized. The virtual product attributes may have additional properties in common that are synchronized. Some of the additional properties (179.1 or 179.2) may exist in only one of the databases if synchronization is not required.

When a change is detected in the value of a synchronized property such as the attribute value (178.1 or 178.2) of a virtual product attribute in one of the databases, the software application 170 will update the corresponding property in the other database. If the value of the attribute label (176.1 or 176.2) common between both portions of the virtual product attribute record (174.1 or 174.2) is unique across each corresponding database (175.1 or 175.2), then the software application 170 can directly identify a matching attribute label (176.1 or 176.2) and update its corresponding value (178.1 or 178.2).

If the value of the attribute label (176.1 or 176.2) common between both virtual product attribute records (174.1 or 174.2) is not unique across each corresponding database (175.1 or 175.2) but is unique within each virtual product 171 then the software application 170 can identify the corresponding virtual product 171 using a value for the virtual product record ID (270.1 or 270.2) that matches the virtual product attribute's (174.1 or 174.2) virtual product record ID value (177.1 and 177.2), then identifying the portion of the virtual product attribute in the other database (174.1 or 174.2) that shares the same value for the virtual product record ID and attribute label value (176.1 or 176.2), then updating that attribute's corresponding attribute value (178.1 or 178.2).

Figure 8B:
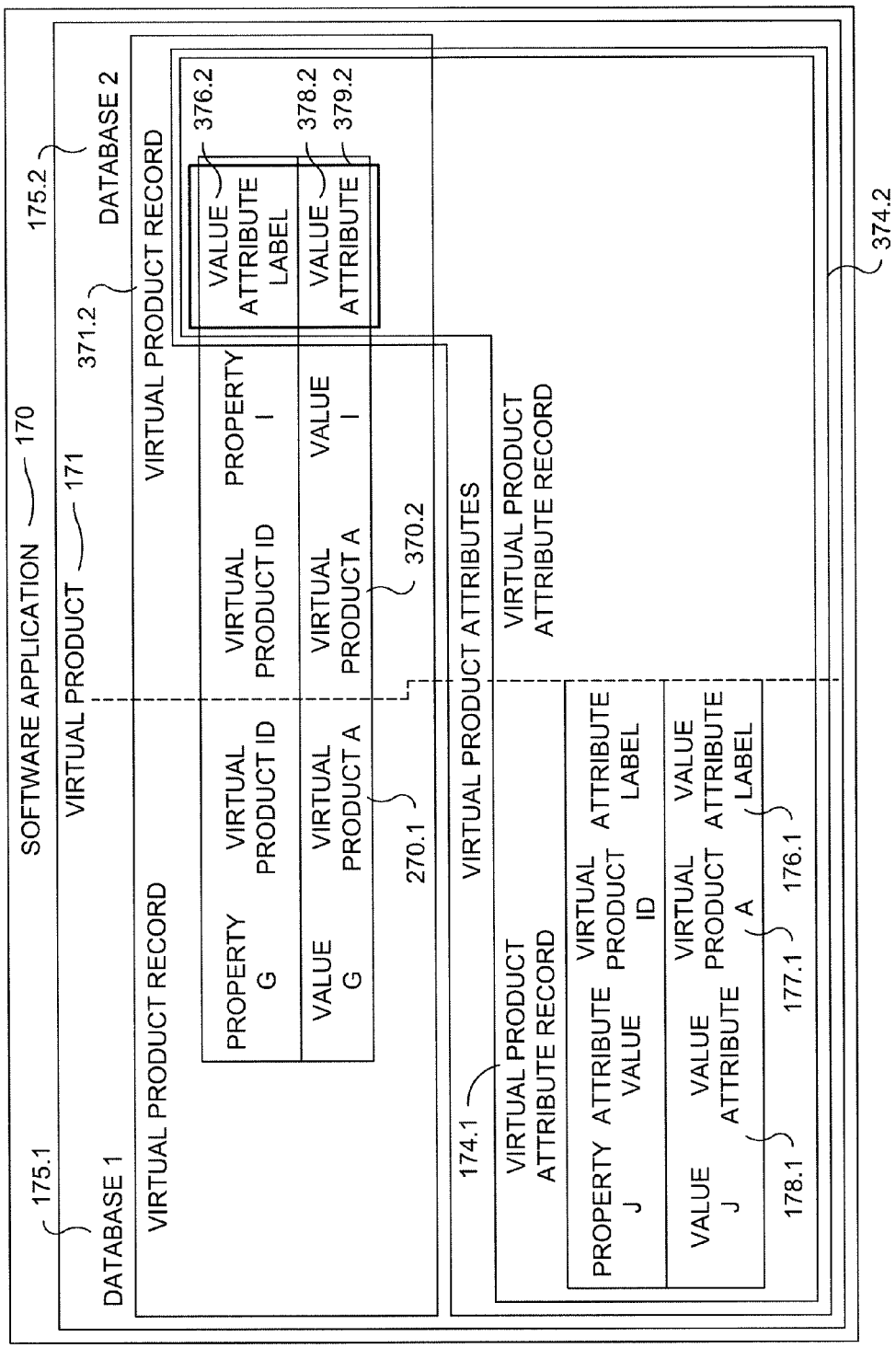
FIG. 8b is a block diagram illustrating an alternative example of updating properties on an attribute.

FIG. 8b is a block diagram illustrating an alternative embodiment of an exemplary attribute property update described by FIG. 8a. When a change is detected in the value of a synchronized property such as the attribute value (178.1 or 378.2) in one of the databases, the software application 170 will update the corresponding property in the other database. If the value of the attribute label (176.1 or 376.2) common between both portions of the virtual product attribute (174.1 or 374.2) is not unique across each corresponding database (175.1 or 175.2) but is unique within each virtual product 171 but only one portion of the virtual product attribute (174.1) contains a virtual product record ID (177.1) while the other portion (374.2) exists directly on the virtual product record (371.2) as a virtual product attribute property (379.2) then the software application 170 can identify (Code5) the corresponding virtual product 171 by identifying the virtual product record ID (270.1 or 370.2) that matches the virtual product record ID (177.1) on the first portion of the virtual product attribute (174.1) or the virtual product record ID (370.2) on the virtual product record (371.2) on which the second portion of the virtual product attribute (374.2) resides, then identifying the portion of virtual product attribute in the other database (174.1 or 374.2) that is associated with the same virtual product record ID (270.1 or 370.2) and shares the same attribute label ID (176.1 or 376.2), then update the corresponding attribute value (178.1 or 378.2).

Figure 8C:
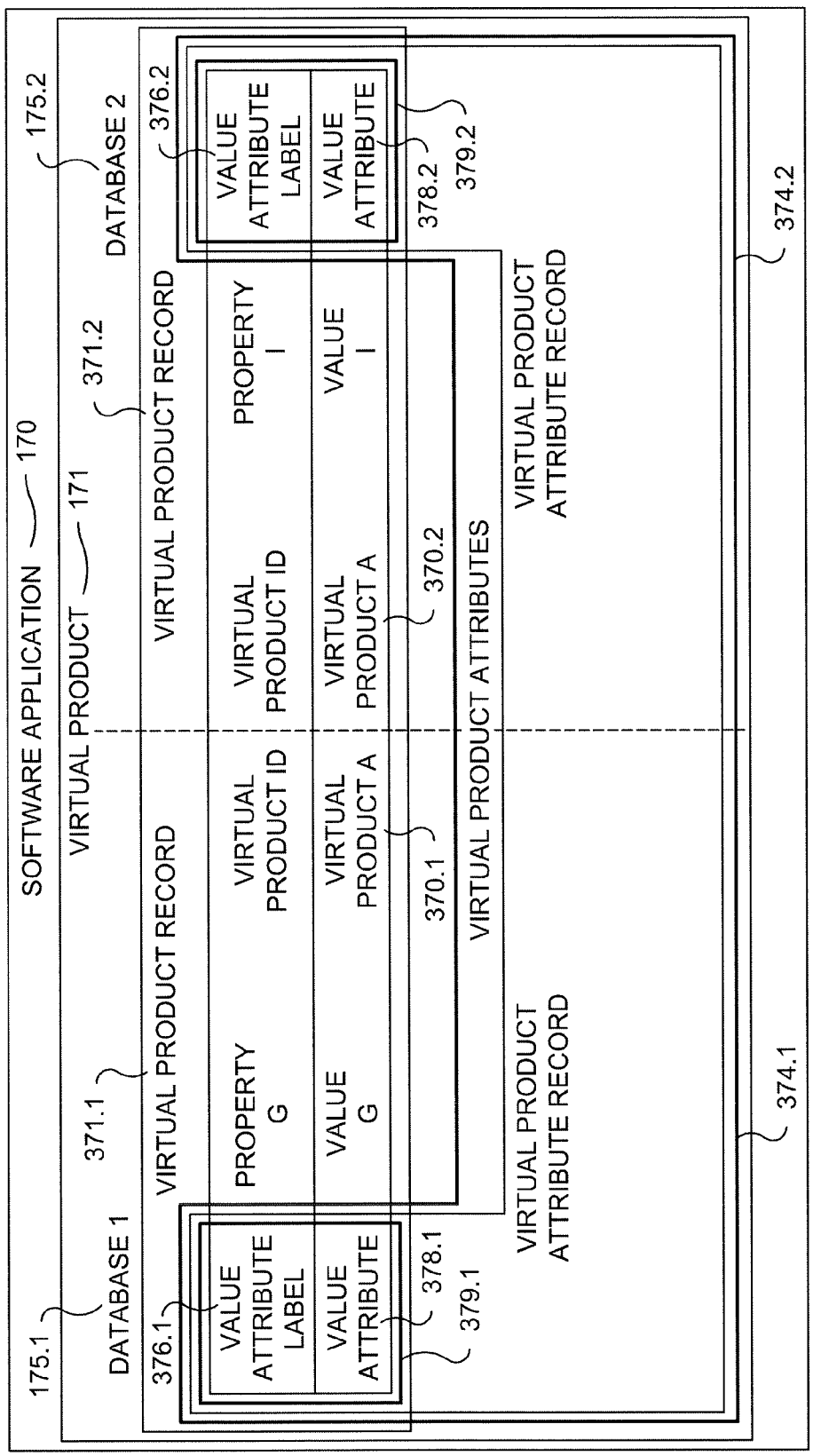
FIG. 8c is a block diagram illustrating an alternative example of updating properties on an attribute.

FIG. 8c is a block diagram illustrating another alternative embodiment of an exemplary attribute property update described by FIG. 8a. When a change is detected in the value of a synchronized property such as an attribute value (378.1 or 378.2) in one of the databases, the software application 170 will update the corresponding property in the other database. If the attribute label (376.1 or 376.2) common between both portions of the virtual product attribute (374.1 or 374.2) is not unique across each corresponding database (175.1 or 175.2) but is unique within each virtual product 171 and both portions (374.1 or 374.2) reside directly on the virtual product record (371.1 or 371.2) as a virtual product attribute property (379.1 or 379.2), then the software application 170 can identify the corresponding virtual product 171 by identifying the virtual product record ID (370.1 or 370.2) on the virtual product record (371.1 or 371.2) on which the virtual product attribute (374.1 or 374.2) resides, then identify the portion of virtual product attribute (374.1 or 374.2) in the other database that is associated with the same virtual product record ID (370.1 or 370.2) and shares the same attribute label (376.1 or 376.2), then update the corresponding attribute value (378.1 or 378.2).

Exemplary Information Flow

Figure 9:
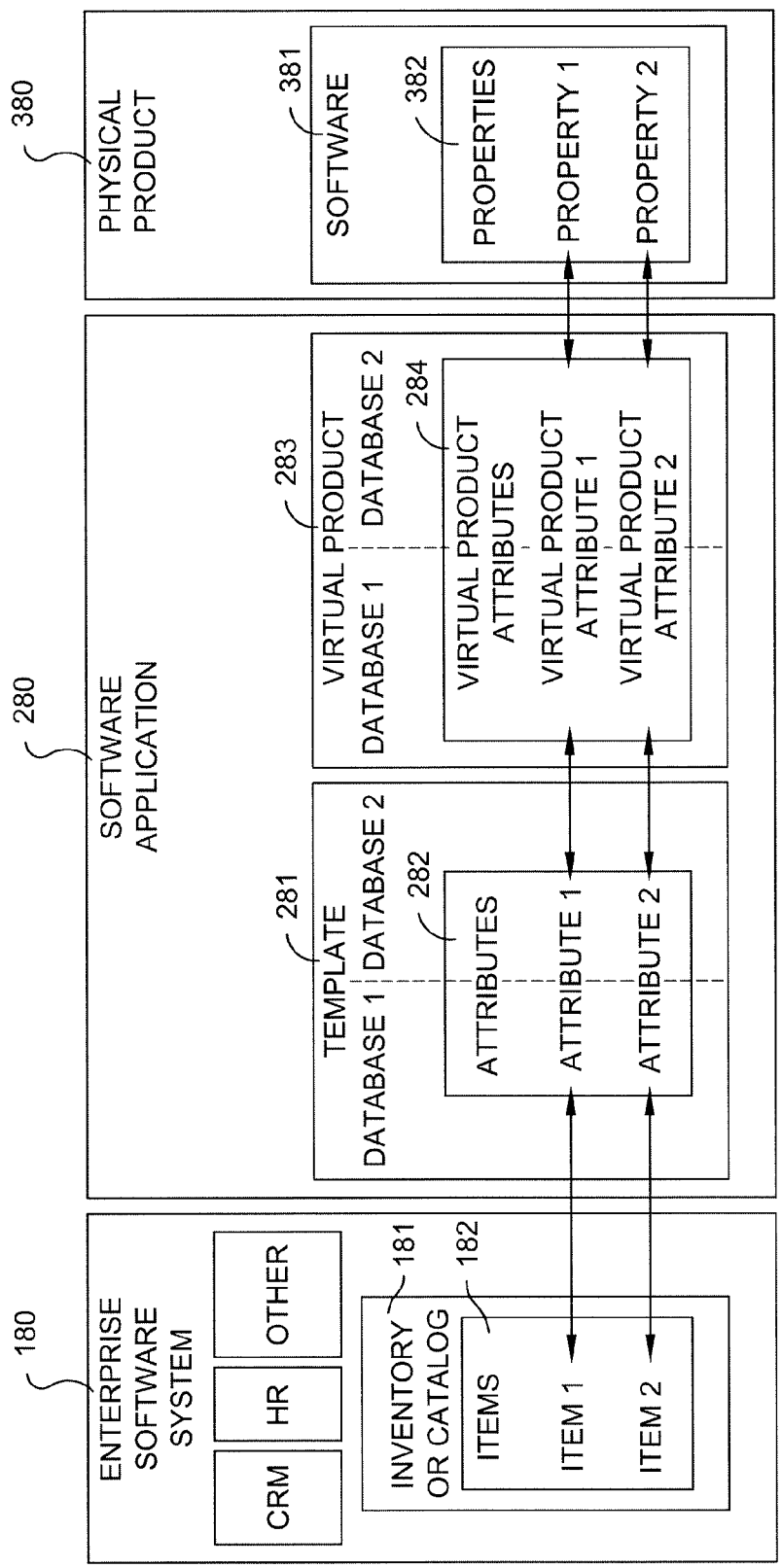
FIG. 9 is a flow diagram illustrating the propagation of information between enterprise software system and physical product via the software application.

FIG. 9 is a flow diagram illustrating the propagation of information between enterprise software and physical product via the software application. The three primary interfaces involved in passing the information are as follows:

1. Between enterprise software system 180 and software application 280. From the inventory or catalog items 182 within the inventory or catalog application 181 within the enterprise software system 180 the information can pass between a corresponding attribute 282 in the software application 280. This relationship between inventory or catalog item 182 and attribute 282 is a one to one relationship, allowing the software application 280 to share information with the enterprise software system 180.

2. Within the software application 280. From the attributes 282 on the template 281 within the software application 280, information can pass between the virtual product attributes 284 on the virtual product 283 that referenced the template 281 at the time the virtual product 283 was created. This relationship between attribute and virtual product attribute is one to many relationship, allowing the attributes 282 to serve as a concentration and distribution point for information from or to any number of individual virtual products attributes 284.

3. Between software application 280 and physical product 380. Information flows between the virtual product attributes 284 on the virtual product 283 within the software application 280, and a corresponding product property 382 within the software 381 within the physical product 380. This relationship between virtual product attribute 284 and product property 382 is a one to one relationship, allowing the software application 280 to interact with the physical product 380. The effect of the interface is independent of the transport path, method or technology used.

An important consequence of the information flow and the updates of property values in the present invention is the ability of the software application to define conditions or rules that are based on property values and to respond to those conditions or rules by automatically providing notifications to users of the product, initiating responses or workflows in the databases, or changing the state or performance of the product. Since the software application spans both databases, changes in property values that violate the conditions or rules set by the software application can be detected and recorded in one database, thereby prompting a type of response appropriate for that database. Simultaneously, the software application can create a new record in the other database indicating a violation of the conditions that can be detected and used to initiate a response appropriate for that database.

The various entities in the figures (e.g., physical product, software application, web browser, enterprise software system) may communicate with one another via any appropriate wired or wireless electronic communication medium.

Exemplary Use Cases

1. Assume the connected physical product is a piece of rental equipment, or a physical attachment to the equipment that permits its operation.
2. Assume the business record or process is a Sales Document that reflects payment for the use of the product.

In the case of information originating from the enterprise software, the disclosed method provides a communication path for existing business processes that utilize the traditional inventory or catalog items, transforming those items into a functional representation of the capabilities of the resulting virtual product, then further transforming those items into the properties that can be interpreted by the physical product's software as software variables thereby allowing standard business processes access to the functional behavior of connected products.

1. Assume a customer wants to use a piece of rental equipment they have on site at their facility. The rental terms were pre-negotiated and would be pay per use, but the payment would have to be executed before each use.
   a. The customer would call the company or log on the website to initiate a new credit card transaction.
   b. After the payment was successfully charged, the customer would be entitled to use the equipment.
   c. The business application or process that executed the transaction would need to activate the remote equipment so that it could be used by the customer.
      i. It would do so by passing property values to one of the databases which could be optimized to support interaction with business applications and processes. In this case there might be properties for Activate The Equipment (Yes) and Remain Active Until (date/time)
   d. Those updated property values would be propagated by the software application to the other database, which could be optimized to support interaction with the products.
   e. The software application would connect with the remote rental equipment and transfer the new property values which could be interpreted by the product's software to allow the equipment to function normally for the prescribed duration.

In the case of information originating from the physical product, this method provides a communication path that organizes and accumulates the data not only by the devices, but also by the inventory and catalog items that comprise the device, providing consistency with conventional product design or configuration frameworks, including bills of material.

1. Assume a customer wants to use a piece of rental equipment they have on site at their facility. The rental terms were pre-negotiated and would be pay per use, with the use being unpredictable but high priority when it occurred.
   a. The piece of rental equipment might have some attachment that could document and authorize that charges be incurred for the use of the equipment as well as activate or unlock the equipment following such authorization.
   b. After the customer authorized this charge by pushing a button or otherwise acknowledging their choice, the equipment would function normally.
   c. Whenever the equipment could next connect to the Internet it would communicate to the software application that the rental had been authorized and accumulated some number of hours of use.
      i. It would do so by passing property values to one of the databases, which could be optimized to support interaction with the products. In this case there might be properties for Process New Payment (Yes) and Hours Used (number)
   d. Those updated property values would be propagated by the software application to the other database, which could have been optimized to support interaction with other business applications and processes.
   e. The changes in the other database could create records for both user acknowledgement and hours to bill for, which could then be used by accounting to initiate the credit card transaction that was pre-authorized as part of the rental agreement.

The present invention may be implemented with any combination of hardware and software. If implemented as a computer-implemented apparatus, the present invention is implemented using means for performing all of the steps and functions described above.

When implemented in software, the software code can be executed on any suitable processor or collection of processors, whether provided in a single computer or distributed among multiple computers.

The present invention can also be included in an article of manufacture (e.g., one or more tangible computer program products) having, for instance, non-transitory computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The computer(s) may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

What is claimed is:

1. A method for allowing a software application that executes on a processor to interact with a product, the product including software that defines one or more properties to control the functions of the product, the method comprising:
   (a) electronically defining a virtual product that spans a first and a second database, the virtual product including a plurality of electronically controllable attributes, the virtual product representing the product, the virtual product in the first and second database that spans the first and second database being the same virtual product;
   (b) maintaining by the software application the virtual product, wherein the portion of the virtual product in the first database includes:
      (i) a virtual product record which includes a unique identifier for the virtual product, and
      (ii) a plurality of unique virtual product attributes, each unique virtual product attribute having corresponding properties, wherein at least one of the properties is the unique attribute label, and
   wherein the portion of the virtual product in the second database includes:
      (i) a virtual product record which includes a unique identifier for the virtual product which is the same as the unique identifier for the virtual product in the first database, and
      (ii) a plurality of unique virtual product attributes, each unique virtual product attribute having corresponding properties wherein at least one of the properties is the unique attribute label; and
   (c) the software application executing on the processor electronically updating a value of a property of a virtual product's unique virtual product attribute in the second database when a change occurs in the first database to a value of a corresponding property with the same attribute label for the same virtual product, thereby allowing the software application to interact with the product by communicating the new property value and its attribute label to the product that corresponds to the virtual product,
   wherein the value of the property controls a function of the product, and wherein the product is a device that further comprises software allowing the device to interact with the software application.

2. The method of claim 1 further comprising:
   (d) the software application electronically updating a value of a property of a virtual product's unique virtual product attribute in the first database when a change occurs in the second database to a value of a corresponding property with the same attribute label for the same virtual product, thereby allowing the software application to interact with the product by communicating the new property value and its attribute label to the product that corresponds to the virtual product.

3. The method of claim 2 wherein the software application specifies a range of values for the property of a virtual product's unique virtual product attribute, and wherein the electronic updating in step (c) occurs when the change to the value in the second database is outside the bounds of a range of values defined by the software application, the method further comprising:
   (e) the software application:
      (i) generates an electronic notification that the updated value is outside the bounds of a range of values defined by the software application, and (ii) creates a new record in the first database to report that the updated value in the second database is outside the bounds of the range of value specified by the software application.

4. The method of claim 3 further comprising:
(iii) initiating a workflow in the first database when the updated value in the second database is outside the bounds of a range of value specified by the software application.

5. The method of claim 1 wherein the software application specifies a range of values for the property of a virtual product's unique virtual product attribute, and
wherein the electronic updating in step (c) occurs when the change to the value in the first database is outside the bounds of a range of values defined by the software application, the method further comprising:
(d) the software application:
(i) generates an electronic notification that the updated value is outside the bounds of a range of values defined by the software application, and
(ii) creates a new record in the second database to report that the updated value in the first database is outside the bounds of the range of value specified by the software application.

6. The method of claim 5 further comprising:
(iii) initiating a workflow in the second database when the updated value in the first database is outside the bounds of a range of value specified by the software application.

7. The method of claim 1 wherein the product is a functional device.

8. The method of claim 1 wherein the product communicates via the software with other functional devices.

9. The method of claim 1 wherein the virtual product further comprises attributes that are a portion of a bill of materials associated with the product.

10. The method of claim 9 wherein the virtual product attributes comprise individual instances of a portion of the bill of materials associated with the product that can interact with the software application.

11. The method of claim 1 wherein the virtual product further comprises attributes that are a portion of catalog items associated with the product.

12. The method of claim 1 wherein the first database is physically or geographically separated from the second database.

13. The method of claim 1 wherein one of either the first database or the second database is embedded within the other database.

14. The method of claim 1 wherein both the first and second database reside as part of a single partitioned database such that the first database forms a portion of the single partitioned database and the second database forms a separate and isolated portion of the single partitioned database.

15. The method of claim 1 wherein the virtual product is an abstraction of an individual physical instance of the product manufactured according to specifications provided by a sales order placed for the product.

16. The method of claim 1 wherein software for controlling the product is embedded in the product, the embedded software allowing information to flow between the product and the software application.

17. The method of claim 1 wherein software for controlling the product is remote to the product, the remote software allowing for interaction between the product and the software application.

18. The method of claim 1 wherein the virtual product attributes comprise physical components, software, and features associated with the product that can interact with the software application.

19. The method of claim 1 wherein the unique identifier is a serial number assigned to the product.

20. The method of claim 1 wherein the change that occurs in the first database to a value of a corresponding property with the same attribute label for the same virtual product is initiated by selecting a state or value for a function of the product via the user interface display screen.

21. The method of claim 1 wherein the virtual product attributes comprise individual instances of a portion of catalog items associated with the product that can interact with the software application.

22. A tangible computer program product for allowing a software application executing on a processor to interact with a product, the product including software that defines one or more properties to control the functions of the product, the computer program product comprising non-transitory computer-readable media encoded with instructions for execution by the processor to perform a method comprising:
(a) electronically defining a virtual product that spans a first and a second database, the virtual product including a plurality of electronically controllable attributes, the virtual product representing the product, the virtual product in the first and second database that spans the first and second database being the same virtual product;
(b) maintaining by the software application the virtual product, wherein the portion of the virtual product in the first database includes:
(i) a virtual product record which includes a unique identifier for the virtual product, and
(ii) a plurality of unique virtual product attributes, each unique virtual product attribute having corresponding properties, wherein at least one of the properties is the unique attribute label, and
wherein the portion of the virtual product in the second database includes:
(i) a virtual product record which includes a unique identifier for the virtual product which is the same as the unique identifier for the virtual product in the first database, and
(ii) a plurality of unique virtual product attributes, each unique virtual product attribute having corresponding properties wherein at least one of the properties is the unique attribute label; and
(c) the software application executing on the processor electronically updating a value of a property of a virtual product's unique virtual product attribute in the second database when a change occurs in the first database to a value of a corresponding property with the same attribute label for the same virtual product, thereby allowing the software application to interact with the product by communicating the new property value and its attribute label to the product that corresponds to the virtual product,
wherein the value of the property controls a function of the product, and wherein the product is a device that further comprises software allowing the device to interact with the software application.

23. The computer program product of claim 22 wherein the change that occurs in the first database to a value of a corresponding property with the same attribute label for the same virtual product is initiated by selecting a state or value for a function of the product via the user interface display screen.

24. The computer program product of claim 22 wherein the computer-readable media is encoded with instructions for execution by the processor to perform a method further comprising:
   (d) the software application electronically updating a value of a property of a virtual product's unique virtual product attribute in the first database when a change occurs in the second database to a value of a corresponding property with the same attribute label for the same virtual product, thereby allowing the software application to interact with the product by communicating the new property value and its attribute label to the product that corresponds to the virtual product.

25. The computer program product of claim 22 wherein the virtual product further comprises attributes that are a portion of a bill of materials associated with the product.

26. The computer program product of claim 25 wherein the virtual product attributes comprise individual instances of a portion of the bill of materials associated with the product that can interact with the software application.

27. The computer program product of claim 22 wherein the virtual product further comprises attributes that are a portion of catalog items associated with the product.

28. The computer program product of claim 22 wherein the virtual product is an abstraction of an individual physical instance of the product manufactured according to specifications provided by a sales order placed for the product.

29. The computer program product of claim 22 wherein the virtual product attributes comprise physical components, software, and features associated with the product that can interact with the software application.

30. The computer program product of claim 22 wherein the unique identifier is a serial number assigned to the product.

31. The computer program product of claim 22 wherein the virtual product attributes comprise individual instances of a portion of the catalog items associated with the product that can interact with the software application.

* * * * *